(12) United States Patent
Dash et al.

(10) Patent No.: US 7,392,250 B1
(45) Date of Patent: Jun. 24, 2008

(54) DISCOVERING INTERESTINGNESS IN FACETED SEARCH

(75) Inventors: Debabrata Dash, Pittsburgh, PA (US); Guy M. Lohman, San Jose, CA (US); Nimrod Megiddo, Palo Alto, CA (US); Jun Rao, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/876,042

(22) Filed: Oct. 22, 2007

(51) Int. Cl.
*G06F 17/30* (2006.01)

(52) U.S. Cl. .................. 707/5; 707/1; 707/2; 707/3; 707/4; 707/7; 707/10; 707/101; 707/102; 707/103 R

(58) Field of Classification Search ............ 707/1, 707/2, 3, 4, 5, 7, 10, 101, 102, 103 R
See application file for complete search history.

(56) References Cited

U.S. PATENT DOCUMENTS 7,146,362 B2   12/2006   Allen et al.

2004/0002879 A1   1/2004   Bernhardt et al.
2007/0118542 A1*  5/2007   Sweeney .................. 707/100
2007/0233651 A1* 10/2007   Deshpande et al. ........... 707/3

OTHER PUBLICATIONS

"Speeding the Application of Bit-Packed Decision Trees," Jun. 1, 1993, IBM Technical Disclosure Bulliten, vol. 36, iss. 6A, pp. 499-500.*

* cited by examiner

*Primary Examiner*—Christian Chace
*Assistant Examiner*—Farhan M Syed
(74) *Attorney, Agent, or Firm*—Cantor Colburn LLP; Marc D. McSwain

(57) ABSTRACT

Exemplary embodiments of the present invention relate to enhanced faceted search support for OLAP queries over unstructured text as well as structured dimensions by the dynamic and automatic discovery of dimensions that are determined to be most "interesting" to a user based upon the data. Within the exemplary embodiments "interestingness" is defined as how surprising a summary along some dimensions is from a user's expectation. Further, multi-attribute facets are determined and a user is optionally permitted to specify the distribution of values that she expects, and/or the distance metric by which actual and expected distributions are to be compared.

1 Claim, 2 Drawing Sheets

Exemplary Facet Hierarchy

Exemplary Facet Hierarchy

US 7,392,250 B1

DISCOVERING INTERESTINGNESS IN FACETED SEARCH

BACKGROUND OF THE INVENTION

1. Field of the Invention

This invention relates to on-line analytic processing, and particularly to on-line analytic processing that is assisted by faceted searching techniques.

2. Description of Background

Before our invention applications such as on-line analytic processing (OLAP) increasingly required that queries specify predicates on both structured and unstructured data. A popular interface for such queries involves faceted searching techniques. Faceted searching typically identifies an initial set of results through keyword search and thereafter utilizes counts that are computed along a few pre-defined dimensions ("facets") in order to aid a user in refining her query with additional predicates until a manageable number of rows remain. In contrast, OLAP analysis seeks trends that are determined to be "interesting" and exceptions to the trends by computing aggregates along dimensions rather than narrowing results to just a few rows.

SUMMARY OF THE INVENTION

The shortcomings of the prior art are overcome and additional advantages are provided through the provision of a method for discovering interestingness in faceted searching query refinement. The method comprises receiving at least one keyword as a constraint value for a query, receiving input in regard to the selection of a probability baseline distribution value, wherein the probability baseline distribution value can be absolute (i.e., it does not change between queries), or relative (i.e., it evolves as query changes), and receiving input in regard to the selection of a metric to determine the distance between a normalized probability distribution of search results on a facet set and a baseline distribution value.

The method further comprises determining a set of candidate facets, the candidate facet sets being based upon the keyword constraint value, determining the probability distribution of the search results on a facet set utilizing bit-set trees, wherein the utilization of bit-set trees contributes to the increased speed in determining the probability distribution of the search results, eliminating uninteresting candidate facet combinations in the instance that a number of values within the probability distribution of the search results exceed a predetermined threshold, determining the most interesting facet combinations, and returning a small number of values whose associated probability differs from that of the baseline the most.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

Exemplary embodiments of the present invention relate to enhanced faceted search support for OLAP queries over unstructured text as well as structured dimensions by the dynamic and automatic discovery of dimensions that are determined to be most "interesting" to a user based upon the data. Within the exemplary embodiments "interestingness" is defined as how surprising a search summary along some dimensions is from a user's expectation. Further, multi-attribute facets are determined and a user is optionally permitted to specify the distribution of values that she expects, and/or the distance metric by which actual and expected distributions are to be compared.

Exemplary embodiments of the present invention support an enhanced faceted search on top of a full-text index. Further, in order to efficiently compute these summaries interactively data sampling techniques are used in conjunction with a directory structure that compactly represents term inclusion in documents Hereinafter the data structure being referred to as a bit-set tree).

Within further exemplary embodiments of the present invention a repository refers to a collection of documents—each document being composed of one or more <facet:value> pairs. It is assumed that the facet and value are strings (although in general the values can be typed). A pair <f:v> represents an instance of facet f, wherein all unique values that are associated with a facet f form the domain of f which is denoted by $d_f$. Further, it is assumed that there is a special facet called "Text" and the value of "Text" contains the free text that is associated with a document for a keyword search. Remaining facets are referred to as regular facets. Unlike a relational model, each document can have multiple instances of a particular facet. For example, a publication document can have two facet instances, <author:X> and <author:Y>.

Figure 1:
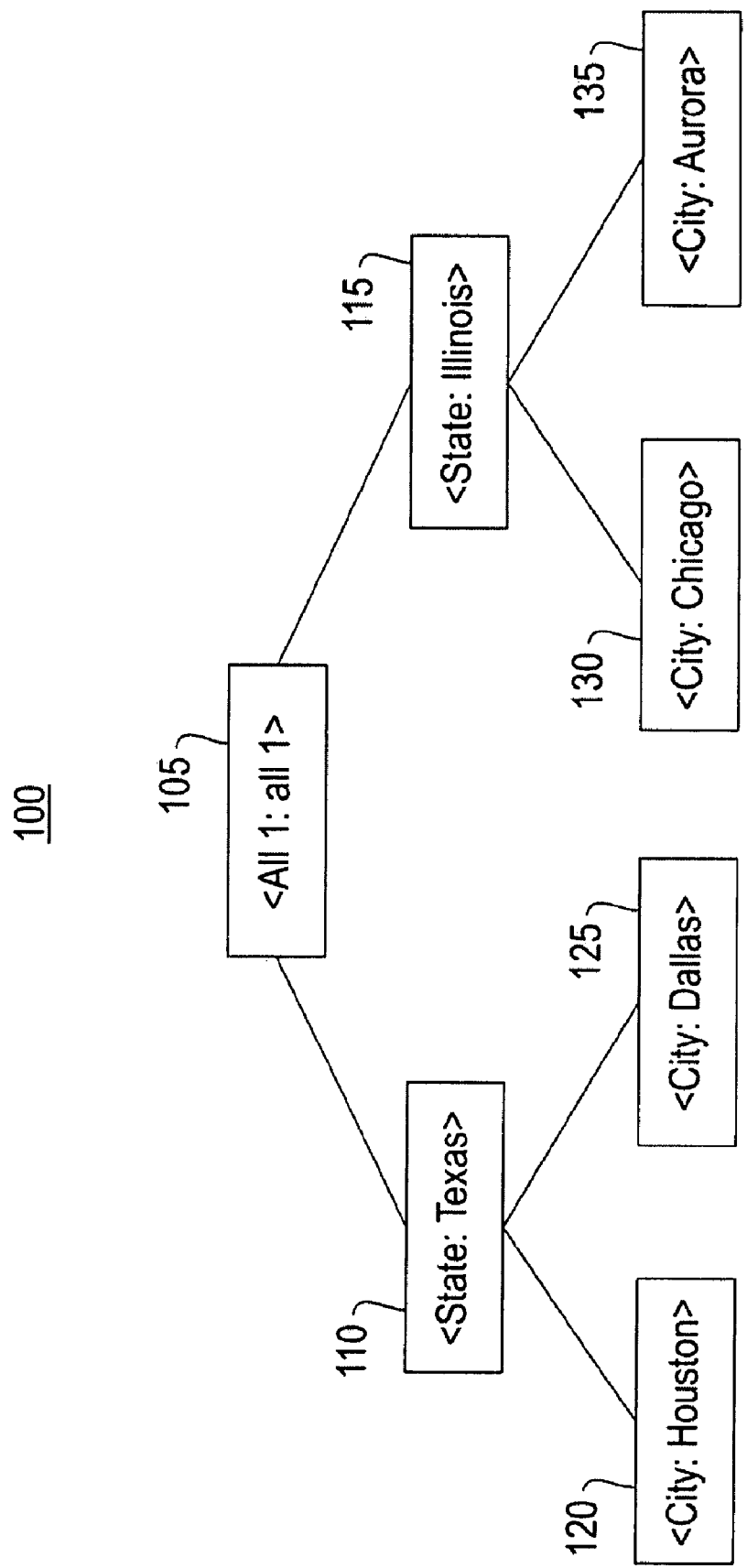
FIG. 1 illustrates one example of a facet hierarchy in accordance with exemplary embodiments of the present invention.

Often, multiple facets will represent the same concept at differing granularities. As shown in FIG. 1 the domain of these facets can be organized into a facet hierarchy 100. Each node (105-135) in the hierarchy stores a <facet:value> pair. A node <f1:v1> is the parent of another node <f2:v2> if for each document, f2=v2 implies f1=v1. For example, in the facet hierarchy 100 node 110<State:Texas> is the parent of nodes 120<City:Houston> and 125<City:Houston>, and node 115<State:Illinois> is the parent of nodes 130<City:Chicago> and 135<City:Aurora>. A unique dummy root node 105 of the form <All_i:all_i> is present where it is assumed that the equality All_i=all_i is true for all documents. While a facet may generally be present in more than one hierarchy, the "Text" facet only belongs to a hierarchy of itself.

Within exemplary embodiments a query q on the repository is specified by one or more constraints in conjunctive form, where each constraint is specified on a single facet f. If f is a regular facet, a constraint on f is of the form "f=value" or "f in (value list)". If f is a "Text" facet, a constraint is of the form "f contains pattern", where pattern is typically a list of keywords, but can be as general as the query syntax used in a typical information retrieval engine with fuzzy and proximity modifiers. $D_q$ denotes a set of documents satisfying all constraints in q. A typical user session starts with a query having a constraint on the "Text" facet followed by the addition or the removal of constraints on regular facets to the original query.

Given a query q and a set of "regular" facet $F=\{f_i|i=1,\ldots,m\}$, a summary $S_{q,F}$ of q on F is computed by grouping $D_q$ on $f_i$ in F jointly and calculating an aggregate value for each group. The difference from relational group-by is that a document d may belong to multiple groups if d has more than one value for a $f_i$. Specifically, $S_{q,F}=\{(v_1,\ldots,v_m,c)\}$, where $v_i \chi d_{fi}$, and c is a scalar aggregate computed over documents in a group satisfying all constraints $f_i=v_i$, $i=\ldots,m$. Within exemplary embodiments of the present invention a particular focus is on a scalar aggregate c, wherein the scalar aggregate c counts the number of documents.

Further, given a repository of documents with n regular facets, we want to select k facet sets $F_1,\ldots,F_k$ for a query q such that summaries of $D_q$ on those facet sets are the most "interesting" to the user. Note that the number of facets associated with a repository can be fairly large. This is especially true when new facets such as person and location are extracted from the unstructured content through text analytics.

In general, "interestingness" is defined as how surprising an aggregated value is from an expected one. Since "interestingness" is subjective any preconfigured setting may not always meet what a user really wants. Within exemplary embodiments of the present invention the concept of "interestingness" is expanded to allow a user to control expected values and distance metrics. Specifically, to measure the "interestingness" of a facet set F for a query q we normalize $S_{q,F}$ and view it as a probability distribution on a finite domain, and then compare the result with a baseline probability distribution B on the same domain. The farther $S_{q,F}$ is from B, then F is determined to be more interesting.

To balance between the control that a user has and the complexity exposed to her, a user is allowed to choose between two kinds of baselines: absolute or relative—the baselines reflecting the behavior of two common types of users. A user of the absolute baseline is assumed to know limited knowledge of the data in the repository. Absent any specific knowledge, we naturally assume the expectation of these users is that all data distributions are uniform and independent of each other. Therefore, we define our first baseline $B_a$ (referred to as absolute baseline) as follows. If F contains only a single facet t; then $B_a$ is a uniform distribution; otherwise, $B_a$ is the product of the independent distribution on each individual facet in F. Therefore, if a first-time user selects the absolute baseline, she will get back summaries on facets that tend to be skewed (such as year) and correlated (such as topic and organization).

A relative baseline user is assumed to be familiar with the repository through earlier querying. Given $S_{q,F}$, the relative baseline is defined as $B_r=S_{q',F}$, where q' is another query. By default, q' is determined to be a true query (including every document in the repository) if q is the very first query in a navigation session, or the previous query of q in the session, otherwise. However, a user can choose a q'. For example, a user familiar with the publication repository can choose the relative baseline to avoid summaries that are unnatural but yet known information to her. As a special case of the relative baseline, a user is allowed to mark certain facets that have an intrinsic ordering as "special." If a query q includes a constraint of f=v on a special facet f, by default, q' is a modification of q by replacing the constraint f=v with a new one f=v', where v' is ordered immediately before v in f's domain.

To quantify the "interestingness" of a facet set, we need a metric to measure the distance between two probability distributions P(X) and Q(X), where X has a domain Ω. Many general distance metrics are applicable here, and, as we shall see, they do not always agree on how far two distributions are apart. Thus, we characterize the nature of some widely used metrics and allow the user to choose one from them. Within exemplary embodiments of the present invention a focus is placed on two popular conventional distance metrics based on L-norm and entropy. A $L_p$ distance is defined as: $L_p(P,Q)=(\Sigma\{|p(x)-q(x)|^p:x\chi\Omega\})^{1/p}$. As a special case, $L_\infty=\max\{|p(x)-q(x)|:x\chi\Omega\}$. The entropy value of a probability distribution P(X) is defined as $H(P(X))=-\Sigma\{p(x) \log p(x):x\chi\Omega\}$. Intuitively, the entropy is the expected amount of information revealed by P(X). The KL-divergence (or relative entropy) and the Jensen-Shannon distance (referred to as JS) between P(X) and Q(X) are defined as:

$KL(P,Q)=-\Sigma p(x) \log(p(x)/q(x))$, $x\chi\Omega$, and
$JS(P,Q)=(KL(P,R)+KL(Q,R))/2$, where $R(X)=((P(X)+Q(X))/2$.

Intuitively, the KL-divergence measures the expected amount of additional information revealed by P(X), given Q(X). When P is the joint distribution of two variables X and Y, and Q is the product of two independent distributions on X and Y, the KL-divergence is equivalent to the mutual information $I(X,Y)=H(X)+H(Y)-H(X,Y)$ which captures the degree of correlation between X and Y. Note that $L_p$ and the JS-distance are symmetric, whereas the KL-divergence is not. Distributions with a larger domain typically have larger entropy, and thus the entropy-based distance among them tends to be larger than those with smaller domains. To compensate for that, we further normalize both the KL-divergence and the JS-distance by a factor of $1/|\Omega|$.

The exemplary faceted search system of the present invention is designed to interactively respond to user queries. For a given query q, the top K most "interesting" facet sets are automatically selected according to the baseline and the distance metric specified by the user. For each selected facet set F, a small number of values in F whose probability differs the most between the query distribution on F and the baseline distribution on F. The user can then select one or more values—presumably those where the two distributions differ the most—in F to drill into. Based on the user selection, the system generates a new query by adding constraints on selected facet values to the previous query q, after this operation the same process is repeated.

The performance of our system is often dominated by the summary computation. Compared with the existing faceted search, the enhanced one faceted search requires much more computation due to the heavy reliance upon discovery rather than rules to select "interesting" facets, the consideration of not only individual facets but also facet combinations, and the intended usage in conjunction with large repositories beyond just catalog data.

For a given query q, it doesn't make sense to always present all facets to a user. For example, presenting a facet with a large number of values is hard for a user to visualize, let alone understand. Therefore, we want to select a subset of facets as candidates for further processing only if the number of facet values is smaller than a threshold τ (e.g., less than 100). To achieve this objective we first preprocess each facet hierarchy until the following property holds: The number of children of each node is less than τ. If a node d has more than τ children then a new facet level is created under d and the children of d are divided into smaller groups. There are many ways of grouping the facet values. For example, for a "price" facet it may be desired to group the values into some fixed number of price ranges.

To determine if a facet f should be a candidate, we make sure that the number of possible values that f can have is smaller than τ, subject to the constraints in q. Specifically, in each facet hierarchy, we select into a set E nodes of <f:v> such that a constraint of "f=v" or "f in ( ..., v, ...)" is in q. If q has no constraint on a facet hierarchy, the root node is selected into E. A facet f becomes a candidate if f is at a level lower than the nodes in E and the total number of f nodes that are descendant of any node in E is smaller than τ. Note that at the beginning of a user session only higher level facets are candidates. As the user starts drilling down, lower level facets become as candidates.

To facilitate identifying candidate facets, we encode a facet f by pre-pending the facet with the path from the root to f in a facet hierarchy. For example, the facet city now becomes All_1:all_1:State:Texas:City. We use the encoded facet in both index terms and query constraints. Such an encoding always clusters together in the index, facet instances belonging to a sub-tree in a facet hierarchy. For a node e of <f:v> in E, all descendant nodes of e can be located quickly by searching for index terms with a prefix of "f:v:". We further iterate through matched index terms to determine candidate facets.

We know turn our focus on how to speedup the computation of a summary on a single candidate facet on top of a text index. This can be accomplished by cache the posting list of an index term as a bit-set in memory. Each bit in the bit-set corresponds to a document ID. Intersecting query result $D_q$ and the posting list of an index term is now simplified to intersection and unioning bit-sets. Observe that for a given facet f, a single document often has zero (because of sparse data) or one instances of f. Therefore, given a document in $D_q$, it is wasteful to have to check its presence in the bit-set corresponding to every value in f. A directory structure called a bit-set tree is developed on top of all the bit-sets of a facet in order to significantly reduce the number of bit-set lookups.

Figure 2:
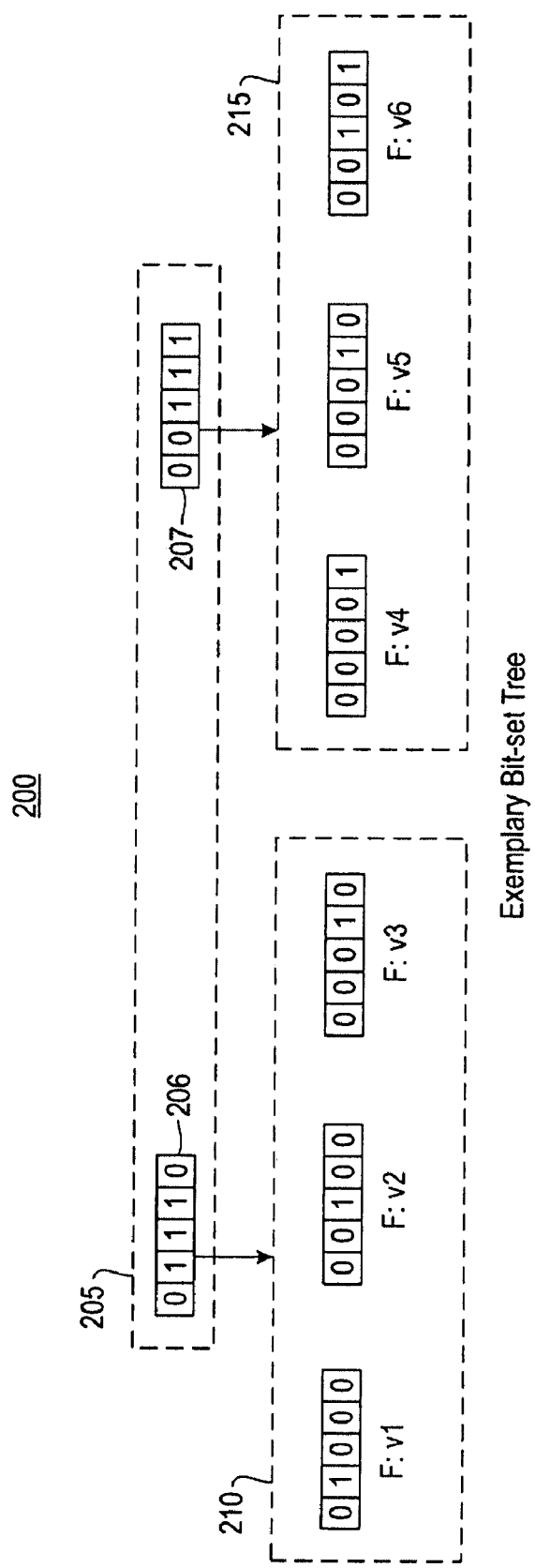
FIG. 2 illustrates one example of a bit-set tree in accordance with exemplary embodiments of the present invention.

As shown in FIG. 2, a bit-set tree 200 is a balanced multiway tree, in which each node has up to s<bit-set, node pointer> entries (s being a fan-out parameter). A bit-set tree is built bottom-up, level by level. Start with the leaf nodes, for each bit-set b of f, we create an entry <b,null>. We then divide all entries into groups of size s (the last group may be smaller than s). For each group, a new leaf node is generated to hold entries in that group, thereafter, the lowest level of internal nodes is built. For each node e in the previous level, a new entry <b',e> is created where, b' is computed by bitwise "oring" the bit-sets in e. Next, the newly created entries are divided into groups of size s and a new node is generated to hold all the entries in each group. We continue building the next higher level of internal nodes until there is only a single new node created. The last node created is referred to as the root.

Given a dth document, we can determine all bit-sets containing d by a single lookup operation on the bit-set tree. We begin at the root of the tree and looks up d in all bit-sets at the root. We then follow the node pointer of those entries with the dth bit on. Note that in general, we may have to follow multiple pointers (resembling a traditional R-Tree). We continue this process until we find all bit-sets in the leaf nodes that contain d. As shown in the bit-set tree of fan-out of FIG. 2 each node 205, 210, 215 is designated by a dashed box. Facet f has values v1 to v6, and the six bit-sets are grouped into two leaf nodes 210, 215. The root node 205 has two entries 206, 207, each pointing to a leaf node 210, 215. For example, to lookup a first document we start at the root node 205 and check the first bit in the two bit-sets 206, 207. Both bits in the nodes 206 and 207 are off because the first document has no instances of facet f. We can stop right here and return an empty set, wherein we will have saved four bit-set lookup operations in this case.

To look up the second document, we again check both bit-sets 206, 207 in the root node 205. Since only the left bit-set 206 has the second bit on we only need to visit the left leaf node 210 and check the three bit-sets that are present. Thus, we need only to check a total of five bit-sets, instead of six. The saving in resources and time being much more significant with the presence of more facet values. Occasionally, we may have to check more bit-sets. For instance, to look up the third document, we have to check all the eight bit-sets in three nodes 205, 210, 215 and perform two extra bit-set lookups. However, we expect those cases to occur infrequently. In general, given n bit-sets, a bit-set tree with fan-out s has $\log_s n$ levels. Assuming that a typical lookup only follows a small number of branches, we expect to check h s $\log_s$ n bit-sets, where h is a small constant. This number is minimized when s/ln(s) is minimized over the natural numbers (e.g., for s=3).

The lookup performance in a bit-set tree depends on how bit-sets are grouped into nodes. Ideally, we want to group bit-sets in such a way that shared bits are common within groups, but rare across groups. A solution is provided heuristically by picking the first bit-set for a node e at random and then continuing to add the next available bit-set that shares the most bits with all bit-sets already in e. Although such a process is quadratic to the number of bit-sets, it is not a big concern since bit-set trees are built only once.

Within exemplary embodiments of the present invention differing ways to probe a bit-set tree are provided. A first approach consists of looking up one document at a time (referred to as one-lookup). Alternatively, $D_q$ can be converted to a bit-set and a single lookup on the bit-set tree can be performed (referred to as set-lookup). Specifically, we first intersect $D_q$ with the bit-set in each entry in the root node. If the intersection has at least one bit on, we pass the intersected bit-set to a child node by following the entry pointer. Thus we obtain for each facet value v a bit-set By representing all documents in $D_q$ containing v. There are tradeoffs between the two approaches. The set-lookup solution amortizes some of the overhead associated with one-lookup. For example, a single instruction of "anding" two integers bit-wise can satisfy up to 32 individual bit lookups. Also, each node in the bit-set tree is traversed at most once for a query. On the other hand, set-lookup has to visit a node as long as one bit in the intersection is on, therefore reducing the opportunity of branch elimination.

For a large repository it is impossible to keep the whole index memory-resident. Within exemplary embodiments we can "pin" in memory the bit-set trees of all top-level facets in each hierarchy because most of the summaries are initially computed on the summaries. To further exploit temporal locality as a user drills in and out of facets, we can additionally allocate a fixed size of buffer to cache the most recently accessed bit-set tree of lower level facets.

Given n facet candidates there are a total of $2^n-n-1$ possible facet combinations on which we may have to compute summaries. Thus, we want to prune as many as unneeded facet combinations as early as possible. Once a facet set has more than τ distinct value combinations it will be removed from further processing. We observe that if a facet set F is pruned then all supersets of F should be pruned as well because they always contain more value combinations than F. To take advantage of this property we evaluate facet sets in increasing set size (i.e., evaluating all facet pairs first, then triples, etc.). Although it now becomes harder to share the computation across different facet set, such a strategy is far more effective in pruning unneeded facet combinations. Another improvement that we make is to avoid combining facets within the same facet hierarchy. Those facets are defined to have functional dependency and are less likely to be useful when presented together.

We can extend both one-lookup and set-lookup for evaluating facet combinations. For one-lookup, we maintain a summary for each facet set. For each document d in $D_q$, we probe the bit-set trees to determine the facet values that d has and then update all summaries with those values. For set-lookup we keep for each unique facet value combination $(v_1, \ldots, v_m)$, a bit-set $B_{(v_1, \ldots, v_m)}$ representing the documents in $D_q$ with that combination. We then enumerate all facet sets in increasing size starting with the pairs. To calculate bit-set $B_{(v_1, \ldots, v_m)}$ for a facet set $\{f_i, \ldots, f_m\}$, we perform a join between $B_{(v_1, \ldots, v_{m-1})}$ and $B_{v_m}$, with the help of the bit-set tree. To be more concrete, we use $B_{(v_1, \ldots, v_{m-1})}$ to perform a set lookup in the bit-set tree of $f_m$. The intersected bit-set derived on $B_{v_m}$ in the leaf node becomes $B_{(v_1, \ldots, v_m)}$. Lastly, the summaries can be calculated by counting the number of 1 bits in each $B_{(v_1, \ldots, v_m)}$.

When $D_q$ is large, the exact computation of the distance metrics may take too long, even with the help of bit-set trees, thus, within exemplary embodiments we approximate the distance measures by sampling a subset of documents $D_q$. Consider for example, the task of picking, from a given set of distributions, one distribution whose entropy is probably close to the minimum entropy. The entropy of a distribution can be estimated by taking a random sample from the distribution and using the entropy of the empirical distribution as the estimate. More precisely, suppose that the underlying distribution has probability $p_i$ for the ith value. Thus, the entropy is $H=-\Sigma p_i \log p_i$. We take a sample of size n and count how many times each value i occurs in the sample. If i occurred $N_i$ times, then the empirical entropy is equal to $G=-\Sigma(N_i/n) \log (N_i/n)$. This includes the possibility that $N_i=0$, and we do not have to know the entire set of values in the underlying distribution. The idea of using the quantity observed in the sample as an estimate of the true quantity is sometimes called the "plug-in principle." Note that in the case of the entropy this gives a biased estimator, because, even though $E[(N_i/n)]=p_i$, we have $E[(N_i/n) \log (N_i/n)]>p_i \log p_i$. Hence, $E[G]<H$. To get a confidence interval about the estimated entropy, we may employ the bootstrap principle. We repeatedly resample—with replacement—from our sample of size n and calculate the entropy of the re-sampled distribution each time. The middle 90% of the entropy values so obtained can serve as a 90% confidence interval, which can guide the identification of a distribution with low entropy.

To obtain a sample, we first define a document set D as $D_q$ if the user chooses the absolute baseline, or $D_q 4 D_q$ if the user chooses the relative one. We start by drawing a sample S from D such that $S \cap D_q$ is larger than uτ, wherein u is a predefined constant. Using the bootstrap principle we compute $S_{q,F}$ and the baseline distribution B from multiple resamples of S and estimate a distance interval between $S_{q,F}$ and B for a user selected distance metric. We then prune uninteresting facet sets based on the estimated distance interval. We continue the above process, increasing the sample size, until the number of surviving facet sets is less than k. Next, we divide documents in the sample S into v segments of equal size and maintain summaries on F segment by segment. We then draw v resamples, each of which includes all segments but one. By accumulating v-1 segment summaries we can efficiently compute summaries for each resample.

Thus, in summary exemplary embodiments of the present invention provide an enhanced faceted search solution for a given a query q, wherein initially a determination is made to identify a set of candidate facets that are based upon the constraints of q. A summary is computed on combinations of candidate facets utilizing bit-set trees, wherein unneeded combinations are pruned during the computation. Further, in the instance that the number of matching documents is large a random sampling technique is employed in order to lower the computation overhead by providing an approximate answer. Lastly, a post pass of the K most "interesting" facet sets $F_{1-K}$ is made in order to eliminate any facet set that is a subset of another facet set comprised within in $F_{1-K}$.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for discovering interestingness in a faceted searching query refinement, the method comprising:
   receiving at least one keyword as a constraint value for a query;
   receiving input in regards to a selection of a probability baseline distribution value, wherein the probability baseline distribution value is determined as a product of an absolute baseline or a relative baseline;
   receiving input in regard to a selection of a metric to determine a distance between a normalized probability distribution of search results on a facet set and a baseline distribution value;
   determining a set of candidate facet, wherein encoding said set of candidate facet by pre-pending said set of candidate facet with a path from root to said set of candidate facet in a facet hierarchy, the candidate facet sets being based upon the keyword constraint value;
   determining a probability distribution of the search results on a facet set and a baseline distribution value utilizing bit-set trees, wherein the utilization of bit-set trees contributes to the increased speed in determining the probability distribution of the search results;

eliminating uninteresting candidate facet combinations in an instance that a number of values within the probability distribution of the search results exceed a predetermined threshold, wherein said uninteresting candidate facet combinations are not within the same said facet hierarchy;

determining most interesting facet combinations;

returning for each interesting facet combination, a small number of most interesting values in it, the small number of most interesting values being the values whose associated probability differs the most between the query distribution and the baseline distribution; and approximating the distance between the normalized probability distribution of search results on a facet set and a baseline distribution utilizing a random sample from the probability distribution.

* * * * *